UNITED STATES PATENT OFFICE.

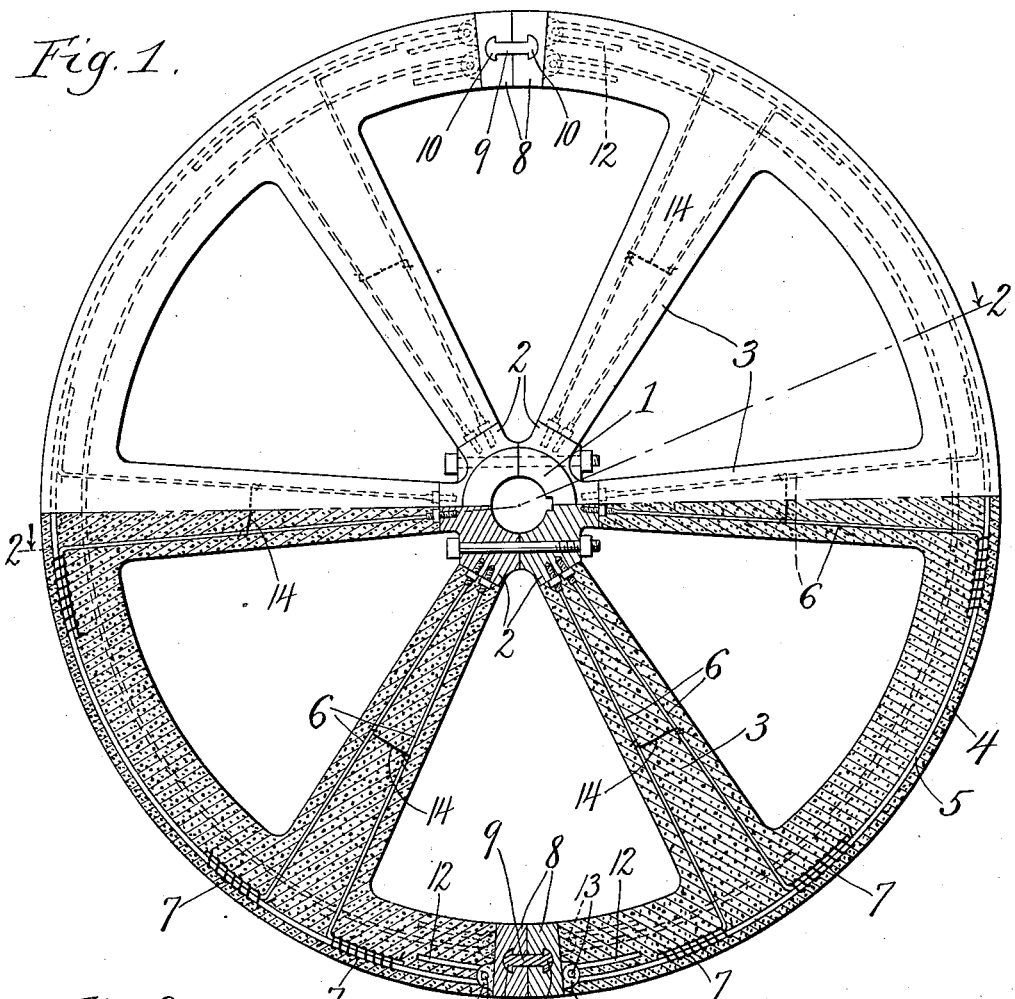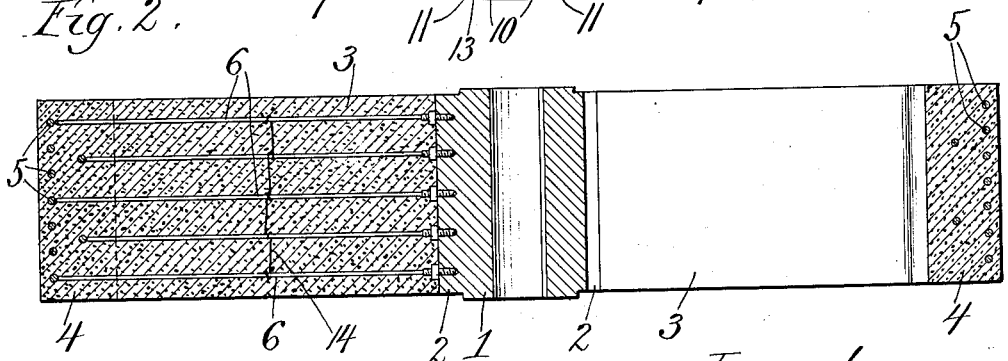

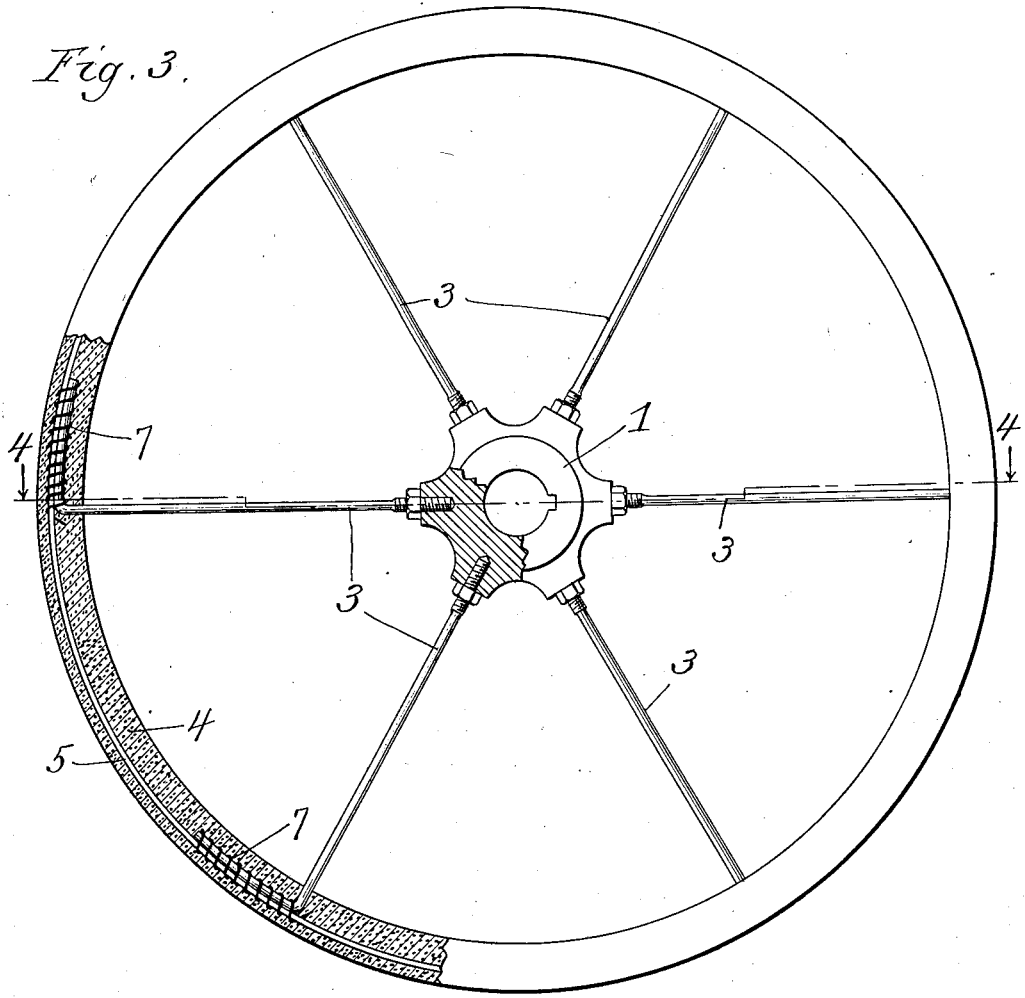
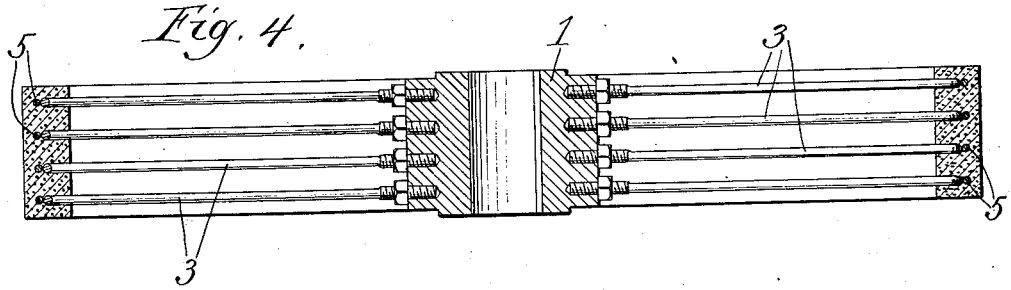

CEPHAS DE WITT WINES, OF CHICAGO, ILLINOIS.

WHEEL.

1,082,668.  Specification of Letters Patent.  Patented Dec. 30, 1913.

Application filed May 31, 1910. Serial No. 564,112.

*To all whom it may concern:*

Be it known that I, CEPHAS DE WITT WINES, a citizen of the United States, residing at Chicago, in the county of Cook and State of Illinois, have invented a certain new and useful Improvement in Wheels, of which the following is a specification.

This invention relates to wheels, and has for its object to provide a new and improved device of this description.

The invention is illustrated in the accompanying drawings, wherein—

Figure 1 is a view of a wheel embodying the invention; Fig. 2 is a sectional view taken on line 2—2 of Fig. 1; Fig. 3 is a view showing a modified construction; Fig. 4 is a sectional view taken on line 4—4 of Fig. 3.

Like numerals refer to like parts throughout the several figures.

Referring now to Figs. 1 and 2, wherein there is shown one form of wheel embodying the invention, there is provided a central hub, 1, made of metal. This hub is provided with projections, 2, at intervals. A series of spokes, 3, are connected to the hub 1 by means of the projections 2. Said spokes are also connected to the rim, 4, which is made of concrete. Embedded in the rim 4 are a series of metal reinforcing pieces, 5, which may be of any desired form, shape and number. As shown in Figs. 1 and 2, these reinforcing pieces are rods, and when the wheel is continuous, that is, has a continuous rim, these rods have their ends joined, or are formed endless or continuous, or with the ends overlapping.

Embedded in the spokes are a series of metal reinforcing pieces, 6, which are connected at one end with the hub 1, and at the other end with the reinforcing metal in the rim. These connections may be made in any desired manner. As herein shown the pieces 6 have their ends connected with the pieces 5 by the pieces 7 wound therearound. The reinforcing metal in the rim binds the parts together, so as to keep the wheel from breaking under the influence of centrifugal force when the wheel is rotated, and the reinforcing metal of the spokes and the projections in addition resist the torsional or shearing stresses.

It will thus be seen that by means of this invention there is provided a wheel made of concrete which can be mounted upon a shaft and rotated like any ordinary wheel, and which is yet of sufficient strength to resist the unusual forces developed in wheels. Wheels of any description may be formed in this manner, such as pulleys, supporting wheels, fly wheels, and the like.

It will further be noted that, in view of the fact that concrete is much cheaper than iron, these wheels can be made much cheaper than wheels of iron. If desired the spokes, 3, may be made entirely of metal, as shown, for example, in Fig. 3.

Instead of making the wheel continuous, it may be made in sections, as, for example, in two parts. When thus made the rim is provided with connecting sections of metal or the like. These sections are fastened to the rim at the meeting points, and are connected together in any desired manner, as by means of the keys 9, having the enlarged ends 10, one of which engages each section. In the split wheel construction the reinforcing pieces 5 may be connected to the connecting sections 8 in any desired manner. A simple construction is to provide such sections with lugs, 11, through which pass the pins 13, the reinforcing pieces 5 being bent back upon themselves to form pins 13, the reinforcing pieces 5 being bent back upon themselves to form loops, the pins 13 engaging the looped ends as shown. The free ends 12 are of sufficient length to be rigidly held in place by the concrete. This construction facilitates the assembling of the parts, as the reinforcing pieces 5 can be bent to the proper shape in the shop, and the pins then removed and the looped ends of the reinforcing pieces placed between the lugs 11, and the pins then placed in position.

When reinforcing pieces 6 are embedded in the concrete, I prefer to provide a series of such reinforcing pieces suitably spaced apart and connected together by the reinforcing connecting pieces 14.

I claim:

1. A wheel comprising a metal hub, a concrete rim, reinforcing metal embedded in said rim, and a plurality of reinforcing metal connections attached to the metal hub and to the reinforcing metal in the rim so as to form a metal connection between them.

2. A wheel comprising a metal hub, a concrete rim, reinforcing metal embedded in said rim, concrete spokes connecting the rim and the hub, reinforcing metal pieces embedded in said spokes and connected at one end to said metal hub and at the other end to the reinforcing metal in the rim.

3. A wheel comprising a metal hub, a concrete rim, reinforcing metal embedded in said rim, a concrete connection between the rim and the hub, said hub provided with projections connected with said concrete connection.

4. A wheel comprising a metal hub, a concrete rim, reinforcing metal embedded in said rim, a concrete connection between the rim and the hub, said hub provided with projections connected with said concrete connection, and reinforcing metal embedded in said concrete connection and connected with said metal hub and the reinforcing metal in said rim.

5. A wheel comprising a hub, a concrete rim, reinforcing metal embedded in said rim, concrete spokes between the hub and rim, a plurality of pieces of reinforcing metal embedded in each of said spokes and pieces of reinforcing metal connecting the reinforcing pieces in the spokes together.

6. A wheel comprising a metal hub, a concrete rim surrounding the hub, a series of separated pieces of reinforcing metal embedded in said rim, a connection between said pieces of reinforcing metal and said metal hub.

7. A wheel comprising a metal hub divided into separable sections, a concrete rim divided into separable sections, reinforcing metal embedded in said rim, and a plurality of reinforcing metal connections between the hub and the reinforcing metal in the rim.

8. A wheel comprising a metal hub, a concrete rim, reinforcing metal embedded in said rim, a plurality of reinforcing metal connections between said hub and said rim, concrete in which said latter connections are embedded, threaded openings in said hub, the ends of said latter connections being threaded and projecting into said threaded openings and nuts on said threaded ends adapted to engage said hub.

9. A wheel comprising a metal hub, a concrete rim, reinforcing metal embedded in said rim, concrete spokes connecting said hub and rim, a plurality of pieces of reinforcing metal embedded in each of said spokes and connected with said hub and the reinforcing metal of said rim, and pieces of reinforcing metal connecting all of the reinforcing pieces in each of said spokes.

10. A wheel comprising a metal hub divided into suitable sections, means for removably fastening said sections together, a concrete rim divided into separable sections, connecting metal pieces at the ends of said sections, means for removably connecting said metal connecting pieces together to form the complete wheel, reinforcing metal pieces embedded in said rim and connected with said metal connecting pieces and reinforcing metal connections connecting said metal hub with said rim.

CEPHAS DE WITT WINES.

Witnesses:
 EDNA K. REYNOLDS,
 DONALD M. CARTER.